United States Patent [19]

Martin et al.

[11] 3,720,735
[45] March 13, 1973

[54] PHOSPHORUS AMIDATES

[75] Inventors: Henry Martin, Basel; Ernst Beriger, Allschwil, both of Switzerland

[73] Assignee: Ciba Geigy AG, Basel, Switzerland

[22] Filed: Aug. 5, 1970

[21] Appl. No.: 61,391

Related U.S. Application Data

[63] Continuation of Ser. No. 639,044, May 17, 1967, abandoned.

[30] Foreign Application Priority Data

May 26, 1966 Switzerland..........................7663/66

[52] U.S. Cl........260/959, 260/247.7 D, 260/293.89, 260/302 E, 260/950, 260/956, 424/200, 424/202, 424/203, 424/220

[51] Int. Cl..............................C07f 9/22, A01n 9/36

[58] Field of Search..............................260/959, 956

[56] References Cited

UNITED STATES PATENTS 2,552,574  5/1951  Moyle et al..........................260/959
2,862,018  11/1958  Kauer...................................260/956

Primary Examiner—Lewis Gotts
Assistant Examiner—Anton H. Sutto
Attorney—Harry Goldsmith, Joseph Kolodny and Bryant W. Brennan

[57] ABSTRACT

The present invention relates to new phosphorus amidates of the general formula

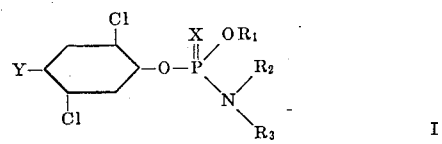

in which X represents an oxygen or a sulphur atom, Y represents a bromine or an iodine atom, $R_1$ represents a low alkyl or alkenyl radical, $R_2$ represents a hydrogen atom or a low alkyl or alkenyl radical and $R_3$ represents a low alkyl or alkenyl radical, or in which $R_2$ and $R_3$, together with the nitrogen atom to which they are bound, constitute a heterocyclic radical which may also contain other hetero atoms in addition to the said nitrogen atom as well as to pesticidal preparations which contain such phosphorus amidates as active ingredients together with a carrier.

12 Claims, No Drawings

PHOSPHORUS AMIDATES

CROSS REFERENCE TO RELATED APPLICATION

This is a continuation of our application Ser. No. 639,044, filed May 17, 1967, now abandoned.

The present invention relates to phosphorus amidates and to their use in pesticidal preparations.

The present invention provides phosphorus amidates of the general formula

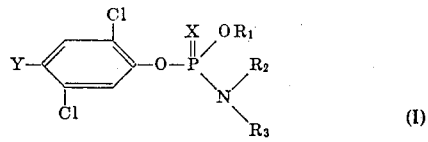

in which X represents an oxygen or a sulphur atom, Y represents a bromine atom or an iodine atom, $R_1$ represents a low alkyl or alkenyl radical, $R_2$ represents a hydrogen atom or a low alkyl or alkenyl radical and $R_3$ represents a low alkyl or alkenyl radical, or in which $R_2$ and $R_3$, together with the nitrogen atom to which they are bound, constitute a heterocyclic ring which may contain other hetero atoms in addition to the said nitrogen atom.

The present invention also provides pesticidal preparations which comprise one or more of the above defined phosphorus amidates as active principle together with a carrier.

In the preparations, there may be present one or more of the following: a solvent, a diluent, a dispersing agent, a wetting agent, an adhesive, a binder, a thickener and, if desired or required, other known pesticidal agents. The new phosphorus amidates of the general formula I are effective insecticides; they are especially effective against pests harmful to stored products, and they are distinguished by their low residual activity, low toxicity and by their systemic action.

The new phosphorus amidates of the formula I and preparations containing the said phosphorus amidates are also effective against different members of the genus *Acarina* (mites, ticks, and so forth). The new phosphorus amidates are also effective against other pests of the animal and vegetable kingdoms, for example, blow fly, boll weevil, and so forth.

The new phosphorus amidates of the general formula I may be prepared in a simple manner by first reacting a phosphoric acid- or thiophosphoric acid-phenolester-dihalide of the formula II

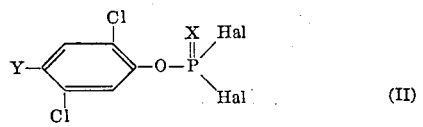

with an alcohol of the formula III $$R_1OH \quad \text{(III)}$$

to form a di-ester of the formula IV

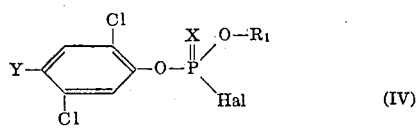

and then reacting the latter with an amine of the formula V

The reaction between a phosphoric acid- or thiophosphoric acid- phenolester-dihalide of the formula II and an alcohol of the formula III may be carried out in the presence or absence of a solvent. The following are examples of suitable solvents: Halogenated hydrocarbons, for example, carbon tetrachloride, dichloroethane and dichloroethylene, In order to ensure that the reaction is as complete as possible, it is preferable to use an excess amount of the alcohol of the formula II (125 to 150 percent of the theoretical amount). The reaction between the monochloride obtained of the formula IV and the amine of the formula V is preferably carried out while at the same time cooling, to prevent side-reactions occurring. It is preferable that the reaction temperature does not exceed the range from 30° to 50°C.

As already stated, the new phosphorus amidates of the formula I possess good insecticidal and fungicidal properties. They may therefore be used to control both agricultural and household pests. For example, they may be used on sprouting vegetation to prevent insect attack without damage to the plants.

Compounds of the formula I, which are especially effective, are those in which Y represents an iodine atom or a bromine atom, $R_1$ represents a low alkyl radical, $R_3$ represents a low alkenyl or alkyl radical and $R_2$ represents a hydrogen atom.

As has already been mentioned, the new preparations may contain various additives in addition to the new active principles of the general formula I. Accordingly, the preparations of the invention can be made up in a very wide variety of forms, which are discussed below.

Solutions to be used directly as sprays contain, for example, mineral oil fractions in the high to medium boiling range, especially those boiling above 100°C, for example, Diesel oil or kerosene; they may also contain coal tar oil or oils of vegetable or animal origin, as well as hydrocarbons, for example, alkylated naphthalenes, tetrahydronaphthalene, xylene mixtures, cyclohexanols and, if desired or required, ketones and chlorinated hydrocarbons, for example, tetrachloroethane, trichloroethylene, trichlorobenzene and tetrachlorobenzene.

When water is to be used as the application medium, the preparations contain emulsion concentrates, pastes or wettable powders that can be diluted with water to give aqueous liquors. The emulsifying or dispersing agents used are nonionic products, for example, condensation products of aliphatic alcohols, amines or carboxylic acids having a long-chain hydrocarbon radical containing about 10 to 30 carbon atoms and ethylene oxide, for example, the condensation product of octadecyl alcohol and 25 to 30 mols of ethylene oxide or that of soybean fatty acid and 30 mols of ethylene oxide or that of technical oleylamine and 15 mols of ethylene oxide or that of dodecylmercaptan and 12 mols of ethylene oxide. However, it is also possible to use condensation products derived from ethylene oxide and hydro-aromatic polycyclic carboxylic acids or amines. Anionic emulsifiers that may be used are as follows: the sodium salt of dodecyl alcohol sulphuric acid ester, the sodium salt of dodecylbenzene sulphonic acid, the potassium or triethanolamine salt of oleic acid or abietic acid or mixtures of these acids, or the sodium salt of a petroleum sulphonic acid. Cationic dispersing agents that may be used are quaternary ammonium and phosphonium compounds, for example, cetylpyridinium chloride or dihy-droxyethylbenzyldodecylammonium chloride.

When the new preparations are to be used as dusting or strewing products, they may contain, as solid excipients; talcum, kaolin, bentonite, sand, calcium carbonate and calcium phosphate, but they may also contain charcoal, cork meal and wood meal, and other materials of vegetable origin. The various preparations may also contain the usual substances that improve dispersion, adhesion and penetration of such preparations; such substances are, for example, fatty acids, resins, glues, casein or, for example, alginates. It is also very advantageous to use the preparations in the form of grains. The new compounds may be the only active principles present in the pesticidal preparations or they may be used in combination with other insecticides, acaricides, nematocides and molluscicides. In plant protection and hygiene, the preparations are applied by the customary spraying, pouring, dusting and fumigation processes.

The present invention also includes the manufacture of the new compounds of the above general formula I, by the methods hereinbefore described and a method of applying the preparations defined above to plants.

The following Examples illustrate the invention. The parts and percentages are by weight.

EXAMPLE 1

A. Four hundred Grams of 2,5-dichloro-4-iodophenol are added during 1 hour to a well-stirred solution of phosphorus oxychloride in pyridine. During the addition of the phenol, the mixture is externally cooled in a manner such that the temperature does not exceed 25° to 28°C. The whole is allowed to stand for 24 hours at room temperature, while stirring. Subsequently, the pyridine hydrochloride which precipitates is isolated by suction filtration and the excess of phosphorus oxychloride is distilled. (Residual $POCl_3$ is removed in vacuo). The residue is distilled in a short column in as low a vacuum as possible. Approximately 350 grams of 0(-2,5-dichloro-4-iodophenyl)-phosphoric acid dichloride boiling at 136° to 138°C. /0.2 mm Hg are obtained.

B. Forty Grams of methanol are dissolved in 300 cc of carbon tetrachloride. The solution so obtained is added drop by drop to a solution of 406 grams of the dichloride obtained as described under A) in 2 liters of carbon tetrachloride. External cooling ensures that the temperature does not exceed 25°C. After 45 minutes, nitrogen is blown through the reaction product to remove the hydrochloric acid which is formed.

A solution of 84 grams of methylamine in 800 grams of ice-cold ether is added drop by drop to the product so obtained, during which process external cooling is applied to ensure that the temperature does not exceed 25°C. The amidation product is washed with water to remove methylamine hydrochloride and the organic solution is dried. Subsequently, the solvent is evaporated and 2,5-dichloro-4-iodophenyl-methylphosphoric acid-N-methylamide, remaining as the oily product, is placed in a refrigerator to crystallize. M.p. 110°C. (from hexane) [Compound No. 1].

The following phosphorus amidates may be obtained by the process described in Example 1

$$\begin{array}{c} R_1-O \quad O \\ \phantom{R_1-}\diagdown \parallel \\ R_2\phantom{-O}P-O-\!\!\left\langle\!\!\begin{array}{c}Cl\\ \phantom{x}\\ Cl\end{array}\!\!\right\rangle\!\!-I \\ \phantom{R_1-O}\diagup \\ \phantom{R_1-}N \\ \phantom{R_1-O-}\diagup \\ R_3 \end{array}$$

| Compound No. | $R_1$ | $R_2$ | $R_3$ | Melting Point |
|---|---|---|---|---|
| 2 | $CH_3$ | H | H | - |
| 3 | $CH_3$ | H | $C_2H_5$ | 86–88° (Hexane) |
| 4 | $CH_3$ | H | $C_3H_7(n)$ | 50–51° (Hexane) |
| 5 | $CH_3$ | H | $C_3H_7(iso)$ | 100–101° (Hexane) |
| 6 | $CH_3$ | H | $C_4H_9(n)$ | Oil |
| 7 | $CH_3$ | H | $C_4H_9(sec)$ | 66–68°(Cyclohexane-hexane) |
| 8 | $CH_3$ | H | $CH_3OC_2H_4$ | Oil |
| 9 | $CH_3$ | $CH_3$ | $CH_3$ | 55–56° (Methanol) |
| 10 | $CH_3$ | $CH_2=CH-CH_2$ | $CH_3,32\ CH-CH_2$ | Oil |
| 11 | $C_2H_5$ | H | $CH_3$ | 87–90° (Hexane) |

EXAMPLE 2

A. Two hundred and eighty nine Grams of 2,5-dichloro-4-iodophenol together with 0.95 gram of anhydrous magnesium chloride and 960 grams of phosphorus trichloride are boiled under reflux until the evolution of hydrogen chloride ceases. The excess phosphorus trichloride is distilled under atmospheric pressure. 32 Grams of sulphur are added at room temperature and the mixture is heated for 30 minutes at a temperature within the range of from 150° to 170°C. Subsequently, the temperature is slowly raised to 260°C. After cooling the reaction mixture, the liquid portion is decanted from the resin and distilled in a high vacuum. 245 Grams of 0-(2,5-dichloro-4-iodophenyl)-thiodichlorophosphate are obtained boiling at 163° to 170°C/.2 mm Hg.

B. 211 Grams of the dichloride obtained in the manner described under A) are introduced into 250 cc of methylene chloride. 32 Grams of methanol are added drop by drop at 20°C. The solution is then boiled for 16 hours. The solvent and volatile matter are evaporated in vacuo and 194 grams of 0-methyl-0-(2,5-dichloro-4-iodophenyl)-thiochlorophosphate in the form of a yellow oil are left as residue.

C. Forty one and eight tenths Grams of the monochloride obtained in the manner described under B) are introduced into 150 cc of methylene chloride. A 10 percent ethereal solution containing 6.2 grams of methylamine is added drop by drop at room temperature during 30 minutes. The batch is stirred for 1 hour at 25°C, the methylamine hydrochloride is washed out with water, the methylene chloride solution is washed with saturated sodium bicarbonate solution and dried over sodium sulphate. The solvent is distilled in vacuo and the residue is 0-methyl-0-(2,5-dichloro-4-iodophenyl)-thiophosphoric acid-N-methylamide, which melts at 81° to 83°C, after recrystallization from cyclohexane [Compound No. 12].

The following phosphorus amidates may be obtained in the manner described in this Example:

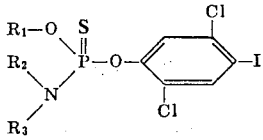

| Compound No. | $R_1$ | $R_2$ | $R_3$ | Melting Point |
|---|---|---|---|---|
| 13 | $CH_3$ | H | $C_2H_5$ | 60–61° (Methanol) |
| 14 | $CH_3$ | H | $C_3H_7(n)$ | 56–57° (Cyclohexane) |
| 15 | $CH_3$ | H | $C_3H_7(iso)$ | 83–84° (Methanol) |
| 16 | $CH_3$ | H | $C_4H_9(n)$ | Oil |

EXAMPLE 3

A Three hundred and seventy four Grams of 4-bromo-2,5-dichlorophenol are slowly introduced, at a temperature within the range of from 20° to 28°C, into a mixture of 765 cc of phosphorus oxychloride and 122 grams of pyridine. The mixture is stirred overnight, and then suction filtered. The excess of phosphorus oxychloride is distilled (finally in vacuo) and the residue is distilled in a high vacuum. 303 Grams of 4-bromo-2,5-dichlorophenyl-phosphoric acid dichloride boiling at 128° to 135°C/0.15 mm Hg are obtained.

B. 35.9 Grams of the dichloride, obtained in the manner described under A), are dissolved in 200 cc of carbon tetrachloride and then 4 grams of methanol, dissolved in 30 cc of carbon tetrachloride, are added at 20° to 25°C. during 15 minutes. The batch is stirred for 30 minutes at 25°C, and then nitrogen is blown through to remove the hydrogen chloride. A solution of 8.4 grams of methylamine in ether is added drop by drop to the product so obtained, in a manner such that the temperature does not exceed 30°C. The amidation product is washed with water to remove methylamine hydrochloride. The organic solution is dried over sodium sulphate and the solvents are distilled in vacuo. The residue is 0-methyl-0-(4-bromo-2,5-dichlorophenyl)-phosphoric acid-N-methylamide, which melts at 76° to 77°C after recrystallization from hexane. [Compound No. 17]. The following phosphorus amidates may be obtained in an analogous manner:

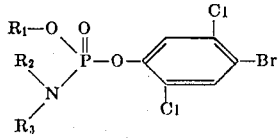

| Compound No. | $R_1$ | $R_2$ | $R_3$ | Melting Point |
|---|---|---|---|---|
| 18 | $CH_3$ | H | $C_2H_5$ | 73–74° (Hexane) |
| 19 | $CH_3$ | H | $C_3H_7$ | 55° (Hexane) |
| 20 | $CH_3$ | H | $C_3H_7(iso)$ | 97–98° (Hexane) |
| 21 | $CH_3$ | H | $C_4H_9$ | Oil |
| 22 | $CH_3$ | H | $C_4H_9(iso)$ | 64–65° (Petroleum ether) |
| 23 | $CH_3$ | H | $C_6H_{13}$ | Oil |
| 24 | $CH_3$ | | | |

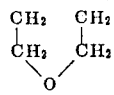

EXAMPLE 4

A. Two hundred and three Grams of 4-bromo-2,5-dichlorophenlthiodichlorophosphate boiling at 142° to 148°C/.2 mm Hg are obtained in the manner described in Example 2 A), from 242 grams of 4-bromo-2,5-dichlorophenol, 960 grams of phosphorus trichloride and 32 grams of sulphur.

B. One hundred and eighty Grams of 0-methyl-0(4-bromo-2,5-dichlorophenyl)-thiochlorophosphate in the form of a yellow oil are obtained in the manner described in Example 2 B), from 187 grams of 4-bromo-2,5-dichlorophenyl-thiodichlorophosphate and 32 grams of methanol.

C. Twenty two Grams of the monochloride obtained in the manner described under B) are added to 90 cc of methylene chloride. 7 Grams of isopropylamine are added drop by drop at room temperature, during 30 minutes. The batch is stirred for 1 hour at 25°C. and the isopropylamine hydrochloride is washed out with water. Then the organic layer is washed with saturated sodium bicarbonate solution and dried over sodium sulphate. The solvent is evaporated in vacuo and the residue is 0-methyl-0-(4-bromo-2,5-dichlorophenyl)-thiophosphoric acid isopropylamide, which melts at 66° to 67°C. after recrystallization from hexane. [Compound No. 25].

The following phosphorus amidates may be obtained in an analogous manner:

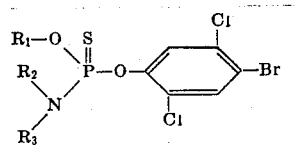

| Compound No. | $R_1$ | $R_2$ | $R_3$ | Melting Point |
|---|---|---|---|---|
| 26 | $CH_3$ | H | $CH_3$ | Oil |
| 27 | $CH_3$ | H | $C_2H_5$ | 54–56° (Petroleum ether) |
| 28 | $CH_3$ | H | $C_3H_7$ | Oil |

The following may be prepared in the manner described in the Examples

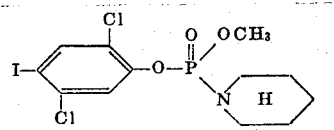

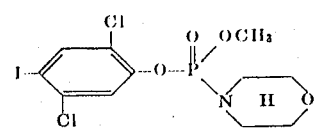

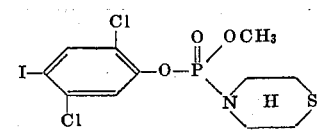

and also the corresponding thiophosphoric acid compounds.

EXAMPLE 5

Sixty Parts of the phosphorus amidate prepared in the manner described in Example 1 are admixed with 10 parts of Aerosol OT (dioctylester of sodium sulphonesuccinic acid) and 30 parts of kerosene. This concentrate is dispersed in water, and thus forms a spray which can be further diluted. When this spray is used against red mite, southern army worm, fruit fly and other insects, 100 percent of them are killed.

EXAMPLE 6

Two hundred Grams of N-isopropyl-0-methyl-0,2,5-dichloro-4-iodophenyl-phosphorus amidate are admixed with a mixture of 108 grams of a non-ionic emulsifier and 12 grams of an ionic emulsifier, and the whole is dissolved in a mixture of 348 grams of xylene and 348 grams of cyclohexanone. This produces 1,016 grams (1,000 cc) of a 20 percent emulsion concentrate which may be diluted as required with water to form a stable emulsion.

EXAMPLE 7

The following results were obtained in a contact test with different compounds of the invention when used as 5% dusting powders

| Concentration | Cockroach | | | Meal beetle 4 | | Dermestes lardarius Larder-beetle 5 | | Rhodnius 6 | Cricket 7 | Dermestes pelio 8 |
|---|---|---|---|---|---|---|---|---|---|---|
| | German 1 | American 2 | Russian 3 | Imago | Larva | Imago | Larva | | | |
| 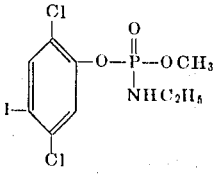 | 12 | 12 | 50 | | 100 | 25 | 25 | 12 | 12 | |
| 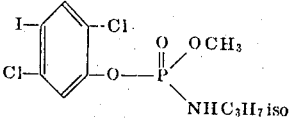 | 12 | 25 | 50 | | 100 | 25 | 50 | 25 | 25 | |
| 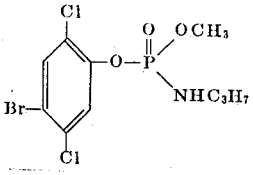 | 25 | 50 | 100 | 100 | 100 | 50 | 25 | 25 | | |
| 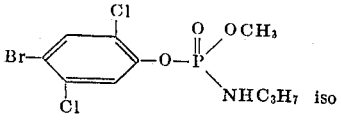 | | 25 | 100 | | 200 | 25 | 25 | 200 | 6 | |
| 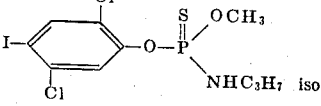 | | 50 | 200 | | 200 | 25 | 25 | 50 | 6 | |
| 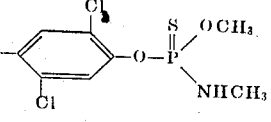 | 25 | 50 | 50 | | 50 | 25 | 25 | 25 | 25 | 50 |
| 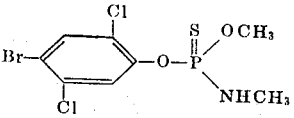 | 25 | 25 | 100 | 50 | | 50 | 50 | 200 | 12 | |

LEGEND: (1) *Phyllodromia germanica*, (2) *Periplaneta americana*, (3) *Blatta orientalis*, (4) *Tenebrio molitor*, (5) *Dermestes frischii*, (6) *Rhodenius prolixus*, (7) *Acheta domestica*, (8) *Attagenus pellio*.

EXAMPLE 8

The efficacy of some of the compounds in combating ectoparasites and vectors was determined by means of a dilution series at 20° ± 1°C. (Limit concentration LC 100 in ppm)

| Compound No. | Snails A. glabratus | Ticks R. bursa | Blow flies Lsericata | Midges A. aegypti (larvae) | Poultry mites D. gallinae |
| --- | --- | --- | --- | --- | --- |
| 4 | 3 | 10 | 2 | 0.01 | 10 |
| 5 | 3 | 10 | 1 | 0.05 | 10 |
| 18 | 3 | 10 | 0.8 | 0.1 | 100 |
| 12 | 3 | 10 | 1 | 0.025 | 1 |
| 14 | 3 | 10 | 1 | 0.012 | 1 |
| 15 | 3 | 10 | 1 | 0.012 | 1 |
| 16 | 3 | 10 | 3 | 0.006 | 1 |
| 13 | 3 | 10 | 1.5 | 0.002 | 1 |

EXAMPLE 9

Even when highly diluted, (2.5 ppm), the compound of the formula

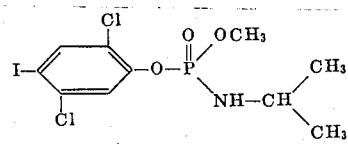

is lethel to plant-parasitic nematodes. Compounds having a similar structure also display powerful activity.

We claim:

1. Phosphorus amidates of the formula

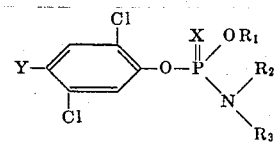

in which X represents an oxygen or a sulphur atom, Y represents a bromine or an iodine atom, $R_1$ represents a low alkyl radical, $R_2$ represents a hydrogen atom or a low alkyl or alkenyl radical and $R_3$ represents a low alkyl or alkenyl radical.

2. The compound of the formula

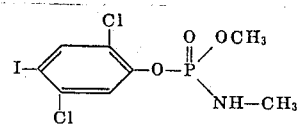

as claimed in claim 1.

3. The compound of the formula

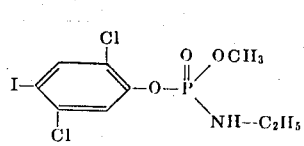

as claimed in claim 1.

4. The compound of the formula

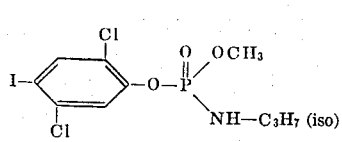

as claimed in claim 1.

5. The compound of the formula

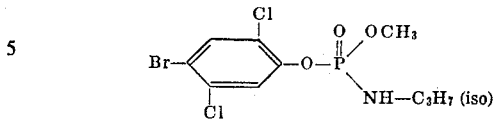

as claimed in claim 1.

6. The compound of the formula

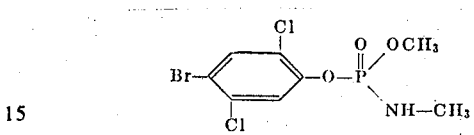

as claimed in claim 1.

7. The compound of the formula

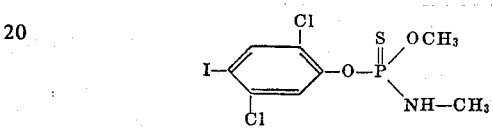

as claimed in claim 1.

8. The compound of the formula

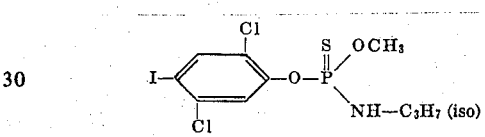

as claimed in claim 1.

9. The compound of the formula

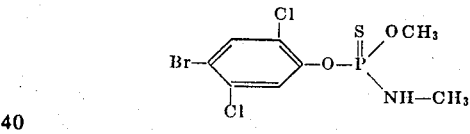

as claimed in claim 1.

10. The compound of the formula

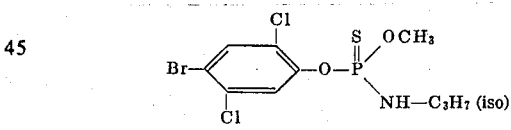

as claimed in claim 1.

11. The compound of the formula

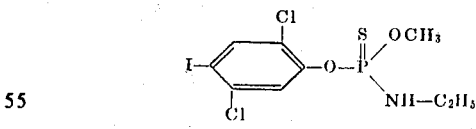

as claimed in claim 1.

12. The compound of the formula

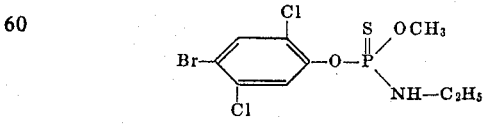

as claimed in claim 1.

* * * * *